US011482092B1

(12) United States Patent
O'Brien et al.

(10) Patent No.: US 11,482,092 B1
(45) Date of Patent: Oct. 25, 2022

(54) SMART SENSORS FOR PLUMBING SYSTEMS

(71) Applicant: UIPCO, LLC, San Antonio, TX (US)

(72) Inventors: Kelsey Anne O'Brien, Austin, TX (US); Meredith Beveridge, Morrison, CO (US); Eric David Schroeder, San Antonio, TX (US); Manfred Amann, San Antonio, TX (US); Matthew Ryan Santacroce, San Antonio, TX (US); Kelly Q. Baker, San Antonio, TX (US); Donnette L. Moncrief Brown, San Antonio, TX (US); Justin Dax Haslam, San Antonio, TX (US); Timothy Frank Davison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/243,295

(22) Filed: Apr. 28, 2021

Related U.S. Application Data

(60) Provisional application No. 63/018,290, filed on Apr. 30, 2020.

(51) Int. Cl.
*G08B 21/18* (2006.01)
*G01N 19/08* (2006.01)
*G08B 5/22* (2006.01)
*G06F 3/14* (2006.01)

(52) U.S. Cl.
CPC ............. *G08B 21/18* (2013.01); *G01N 19/08* (2013.01); *G06F 3/14* (2013.01); *G08B 5/22* (2013.01)

(58) Field of Classification Search
CPC .......... G08B 21/18; G08B 5/22; G01N 19/08; G06F 3/14
See application file for complete search history.

(56) References Cited

U.S. PATENT DOCUMENTS

| 3,597,680 | A | * | 8/1971 | Haddon | G01V 3/15 |
| | | | | | 324/67 |
| 4,016,748 | A | * | 4/1977 | Boyens | G01M 3/02 |
| | | | | | 73/40.5 R |
| 4,783,252 | A | * | 11/1988 | Benton | G01N 27/283 |
| | | | | | 204/435 |
| 4,894,539 | A | * | 1/1990 | Hurst | G01M 3/22 |
| | | | | | 250/303 |
| 5,790,476 | A | * | 8/1998 | Stenstrom | E03F 7/00 |
| | | | | | 73/19.1 |
| 5,992,246 | A | * | 11/1999 | Nice | G01M 3/005 |
| | | | | | 73/865.8 |
| 6,545,704 | B1 | * | 4/2003 | Olsson | G01M 3/005 |
| | | | | | 348/E7.087 |

(Continued)

*Primary Examiner* — Hai Phan
*Assistant Examiner* — Son M Tang
(74) *Attorney, Agent, or Firm* — Plumsea Law Group, LLC

(57) ABSTRACT

A method and system of identifying a location of an obstruction site in a plumbing system is disclosed. The system and method are configured to allow for the deployment of a smart sensor device into a pipeline and transmit data regarding its location and external conditions to a nearby monitoring device. Upon arriving at an obstruction in the pipeline, the sensor device can automatically transmit a signal indicating the current location of the sensor device.

20 Claims, 11 Drawing Sheets

(56) References Cited

U.S. PATENT DOCUMENTS

| | | | | |
|---|---|---|---|---|
| 6,571,634 B1* | 6/2003 | Bazarov | G01N 29/48 | 73/623 |
| 6,931,952 B2* | 8/2005 | Rantala | G01M 3/005 | 73/431 |
| 7,009,399 B2* | 3/2006 | Olsson | G01V 3/15 | 324/329 |
| 7,100,463 B2* | 9/2006 | Boudreaux | F16L 55/48 | 73/866.5 |
| 7,221,136 B2* | 5/2007 | Olsson | G01V 3/081 | 324/67 |
| 7,523,666 B2* | 4/2009 | Thompson | G01M 3/246 | 73/632 |
| 7,955,268 B2* | 6/2011 | Huelskamp | A61B 5/0002 | 600/486 |
| 8,776,580 B2* | 7/2014 | e Souza | G01M 3/005 | 73/49.1 |
| 9,715,011 B2* | 7/2017 | Krapf | G01V 3/15 | |
| 10,653,027 B2* | 5/2020 | van Pol | G01F 1/684 | |
| 10,801,915 B2* | 10/2020 | Ramirez Garcia | G01M 3/246 | |
| 11,047,759 B2* | 6/2021 | van Pol | G01L 19/149 | |
| 2003/0121338 A1* | 7/2003 | Yates | F16L 55/38 | 73/53.01 |
| 2004/0044393 A1* | 3/2004 | Yarden | A61F 2/86 | 623/1.2 |
| 2006/0006875 A1* | 1/2006 | Olsson | G01V 3/081 | 324/338 |
| 2006/0101915 A1* | 5/2006 | Thompson | G01M 3/246 | 73/592 |
| 2007/0027824 A1* | 2/2007 | Gibson | E03C 1/12 | 705/413 |
| 2007/0063856 A1* | 3/2007 | Gibson | F22B 37/50 | 340/608 |
| 2008/0055155 A1* | 3/2008 | Hensley | G01S 19/51 | 342/357.34 |
| 2008/0105067 A1* | 5/2008 | Frey | G01S 17/48 | 73/865.8 |
| 2008/0148503 A1* | 6/2008 | Babb | B08B 9/045 | 15/104.33 |
| 2008/0204008 A1* | 8/2008 | Paulson | G01M 3/005 | 324/220 |
| 2008/0210024 A1* | 9/2008 | Merlo | G01M 3/047 | 73/865.8 |
| 2009/0300863 A1* | 12/2009 | Bartucciotto | E03C 1/302 | 15/104.33 |
| 2010/0064775 A1* | 3/2010 | Ben-Mansour | G01M 3/2823 | 73/40.5 A |
| 2010/0109903 A1* | 5/2010 | Carrick | G06K 7/0008 | 340/8.1 |
| 2010/0117826 A1* | 5/2010 | Reed | G06Q 10/08 | 340/539.32 |
| 2011/0103189 A1* | 5/2011 | Paulson | G01S 11/14 | 367/93 |
| 2012/0300057 A1* | 11/2012 | Bartucciotto | F16L 55/48 | 134/166 C |
| 2012/0316963 A1* | 12/2012 | Moshfeghi | G06Q 30/02 | 705/14.58 |
| 2013/0199272 A1* | 8/2013 | Khalifa | G01M 3/005 | 73/40.5 A |
| 2013/0314534 A1* | 11/2013 | Hinman | G08B 13/248 | 348/143 |
| 2014/0027000 A1* | 1/2014 | Kiest, Jr. | F16L 55/38 | 138/97 |
| 2014/0260626 A1* | 9/2014 | Kulczyk | B64D 37/32 | 73/592 |
| 2015/0116119 A1* | 4/2015 | Macdonald | E03F 7/00 | 340/608 |
| 2015/0146216 A1* | 5/2015 | Krauhausen | G01B 11/002 | 356/612 |
| 2017/0219157 A1* | 8/2017 | Ethirajan | H04B 1/3827 | |
| 2018/0149546 A1* | 5/2018 | Boyes | G01M 3/246 | |
| 2018/0239999 A1* | 8/2018 | Gayton | G06K 19/025 | |
| 2018/0283978 A1* | 10/2018 | Ramirez Garcia | G01M 3/005 | |
| 2020/0012182 A1* | 1/2020 | Warren | H01B 11/1843 | |
| 2020/0326207 A1* | 10/2020 | Kwon | G01C 21/1654 | |
| 2022/0065061 A1* | 3/2022 | Sehsah | E21B 23/01 | |

* cited by examiner

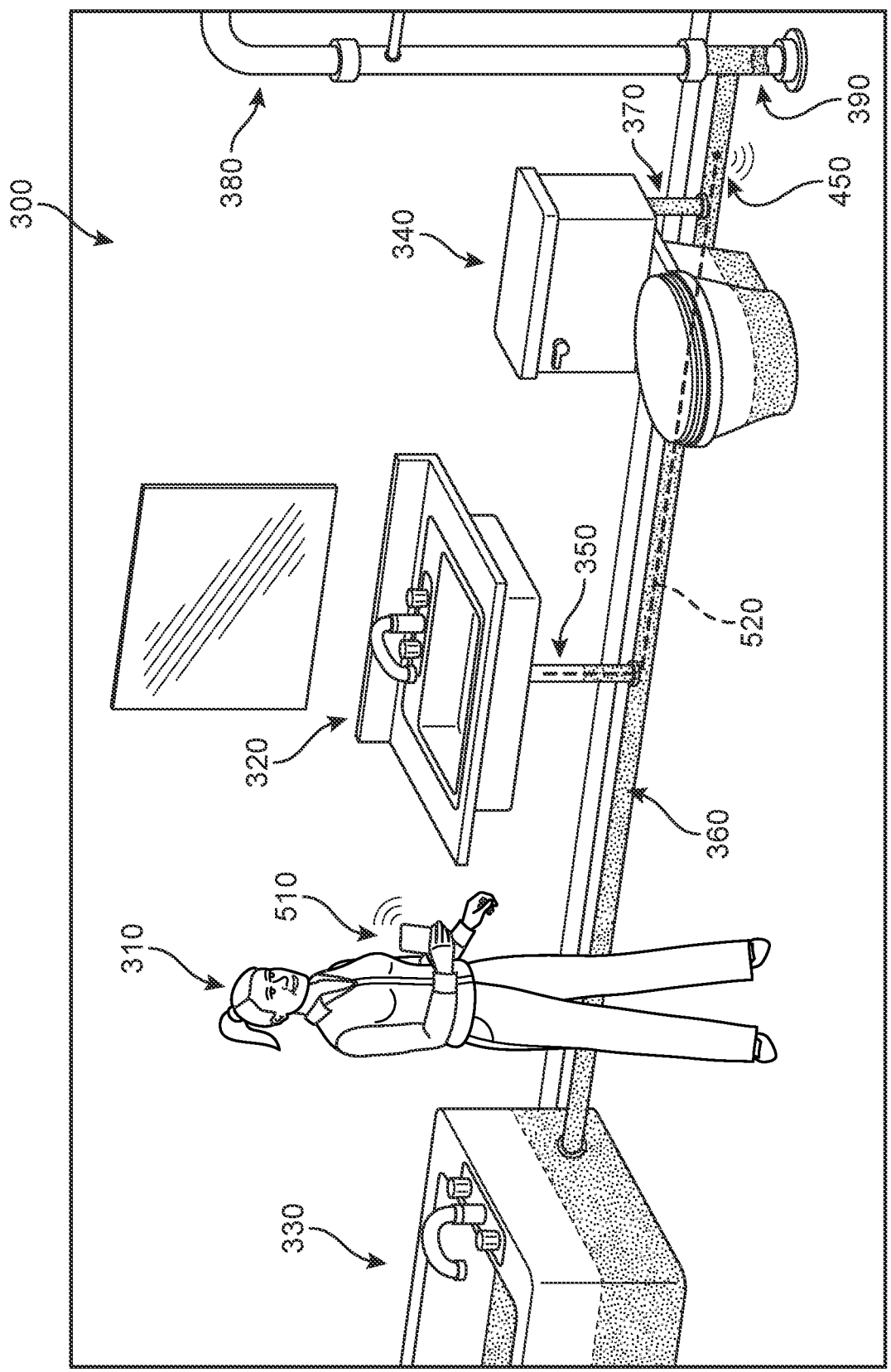

SMART SENSORS FOR PLUMBING SYSTEMS

CROSS-REFERENCE TO RELATED APPLICATION

This application claims the benefit of U.S. Provisional Patent Application Ser. No. 63/018,290 filed on Apr. 30, 2020 and titled "Smart Sensors for Plumbing Systems", the disclosure of which is incorporated by reference in its entirety.

TECHNICAL FIELD

The present disclosure generally relates to inspections and monitoring of obstructions in drain pipes and plumbing fixtures, and specifically to a method and system of determining the location of an obstruction in a pipe.

BACKGROUND

Sewer pipes and other drain pipes often become blocked during usage. A blocked pipe can cause substantial loss of revenue to a business relying on the continuous flow of the contents of the pipeline, and substantial inconvenience to home owners and other users. In many cases, one of the most challenging first steps is to locate the blockage so that an appropriate method for removing the blockage can be determined. Consumers often engage in a trial-and-error approach until the blockage is located and eliminated, and resources and time are expended in simply identifying the location of the blockage with some level of accuracy. A detection system and method that are capable of remotely determining the location of a pipe blockage in a practical and cost-effective manner would therefore be beneficial.

There is a need in the art for a system and method that addresses the shortcomings discussed above.

SUMMARY

In one aspect, a method of generating data indicating a location of an obstruction in a plumbing system is disclosed. The method includes detecting an activation signal for a first sensor device and activating, in response to detecting the activation signal, the first sensor device. The method also includes automatically emitting, from the first sensor device, a first signal when the first sensor device is stationary for at least a first time period.

In another aspect, a system for generating data indicating a location of an obstruction in a plumbing conduit includes a processor and machine-readable media including instructions which, when executed by the processor, cause the processor to detect an activation signal for a first sensor device, and activate, in response to detecting the activation signal, the first sensor device. The instructions further cause the processor to automatically emit, from the first sensor device, a first signal when the first sensor device is stationary for at least a first time period.

In another aspect, a system for generating data indicating a location of an obstruction in a plumbing conduit includes means for detecting an activation signal for a first sensor device and means for activating, in response to detecting the activation signal, the first sensor device. In addition, the system includes means for automatically emitting, from the first sensor device, a first signal when the first sensor device is stationary for at least a first time period.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 5 and 6 are an illustration of the user activating the deployed smart sensor device and communicating with the smart sensor device via an application on a monitoring device as the smart sensor device travels through the plumbing system, according to an embodiment;

DETAILED DESCRIPTION

Figure 1A:
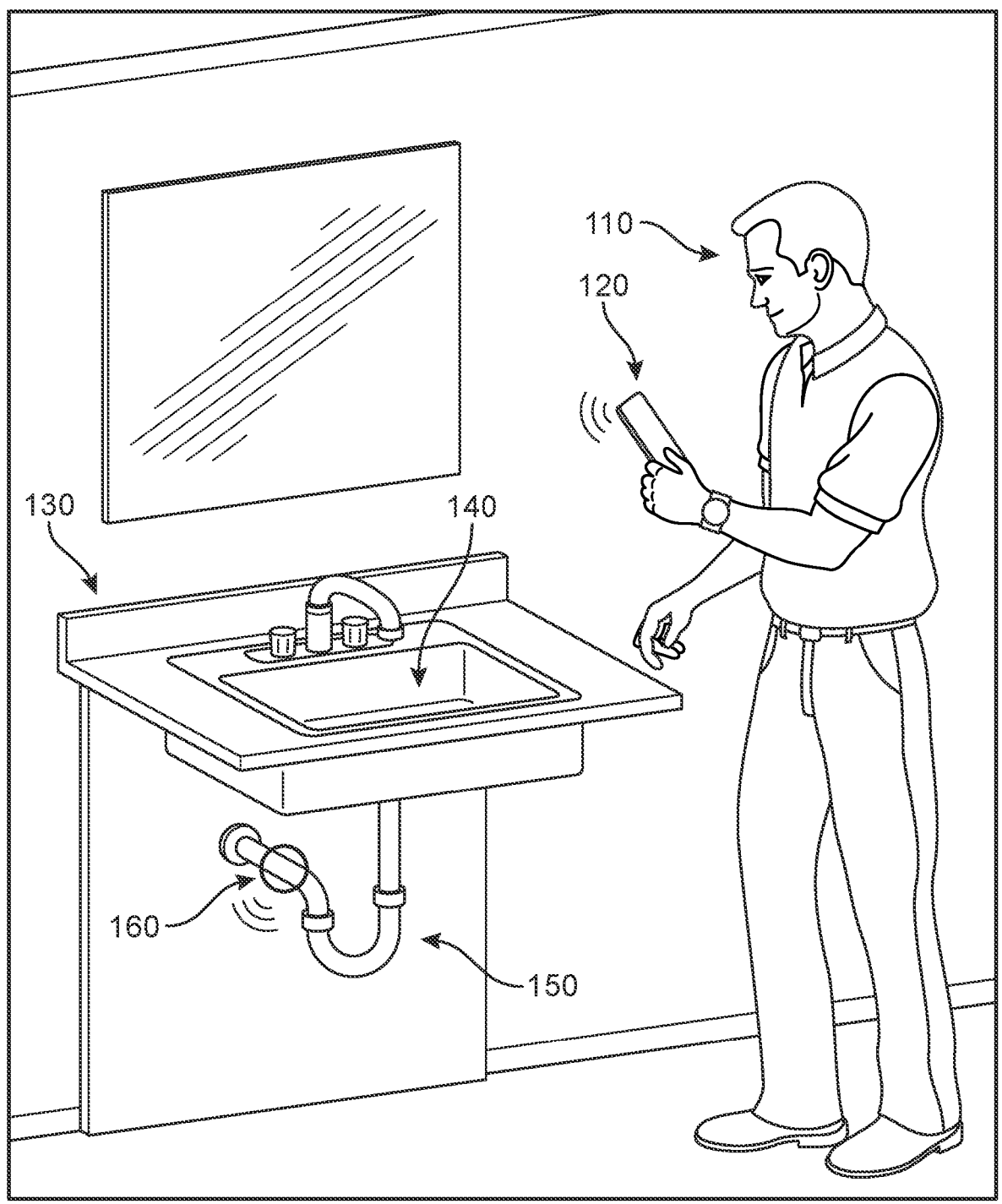
FIGS. 1A and 1B are a sequence presenting an overview of a scenario in which a person encounters a clogged pipe and deploys a sensor device to track the location of the obstruction, according to an embodiment.

The embodiments provide a method and system to improve the detection and monitoring of obstructions occurring in plumbing and drainage systems. Specifically, the method and system enable the detection of the clog point in pipes in a relatively economical and accurate manner. In facilities and equipment that use water, it is normal to have a drainage pipe that is a drainage facility for discharging the used water (drainage) to the outside. Drainage systems are implemented everywhere from homes to businesses. Drainage pipe tends to be clogged as compared with a water supply pipe or the like. Once a drainage pipe is clogged, drainage becomes slowed or blocked and facilities and equipment become unusable in many cases. Eventually all drainage pipe structures experience becoming clogged or broken through any variety of means causing them to fail at their intended purpose. In many septic or sewage systems, the fluids and materials to be drained can be hazardous and a backup or flood at the source is potentially dangerous (e.g., raw sewage). While some mechanisms do exist to detect blockages, they do not monitor the pipe structure itself, but instead measures the result of a clog such as water level rise, flooding, and backups. Those systems that do detect issues in pipe structures are large and expensive and typically used in industrial applications, and rarely available for commercial or consumer monitoring. The following systems and methods provide a mechanism by which persons with little to no technical plumbing expertise can quickly and precisely determine the location of an obstruction in a pipe. A small sensor device can be deposited into the drainage system and is transported through the pipe until reaching the location of the blockage. Once the sensor device arrives at the clogged site, it stops moving. The sensor device can transmit an alert signal to the user, for example, via an RFID or Bluetooth® transmission, that allows the user to monitor the location of the sensor device in real-time and readily identify the clogged area. Such information can be used to more quickly and effectively respond to the damage and ensure that repair efforts do not interfere with otherwise unaffected pipe regions.

For purposes of this application, terms such as clog, blockage, and obstruction will be used to indicate any solid, gas, liquid, or possible combination of components thereof which reduces, restricts, or otherwise interferes with normal movement of the contents of an enclosed flow environment. The term enclosed environment is used herein to indicate a containment of a gas, fluid and/or liquid and/or inter-phases thereof and can include, for example and without limitation, a pipeline, a tank, or a portion thereof. In addition, the term drainage will refer to fluid flow that may also include dirt, particulates, foreign matter, impurities, and other solid or semi-solid components. A clogged pipe will be understood to refer broadly to any such enclosed environment in which the normal flow of fluid is impeded due to an obstruction or blockage. The site of such obstruction will be referred to as a clog site or an obstruction site. In addition, the associated effects of such an obstruction will be referred to generally as impeded flow.

For purposes of clarity, an overview of one embodiment of the proposed systems and methods is illustrated with reference to FIGS. 1A and 1B. In FIG. 1A, a first user 110 is shown in standing near a sink 130 while holding a first monitoring device ("first device") 120. Though not shown in FIG. 1A, a smart sensor device ("sensor device") has been deployed into a drain opening 140 formed at the bottom of the sink 130 and has traveled down a pipe 150 until arriving at a clog site 160 (indicated by a circular symbol). In different embodiments, the sensor device includes a plurality of components that are configured to permit the sensor device to communicate with other devices and/or to detect or monitor various external conditions. In this embodiment, the plurality of components can be understood to include at least a wireless communication module (such as near-field communication (NFC), Radio Frequency Identification (RFID), or Bluetooth® technology) or other type of short-range wireless communication sensor, such as a sensor employing Wi-Fi or similar wireless technology, and a battery or other power source that is configured to supply electrical power to the sensor device. In some embodiments, the plurality of components further includes additional sub-sensors that are configured to measure parameters associated with movement of the smart sensor device. For example, in some embodiments, the plurality of components can include an accelerometer and/or gyroscope configured to measure acceleration and rotational values and a force sensor configured to measure force values. In some embodiments, the accelerometer and/or force sensor may be used to measure parameters, such as acceleration, speed, orientation, force, etc., associated with the pattern of movement of the smart sensor device. In addition, in other embodiments, the smart sensor device may also include components configured to detect or capture information associated with characteristics and conditions of the external environment such as temperature, pressure, moisture, light, chemical composition, and other external conditions. In addition, in some embodiments, the smart sensor device may be configured for one-time use and for safe disposal in a sewer system.

Figure 1B:
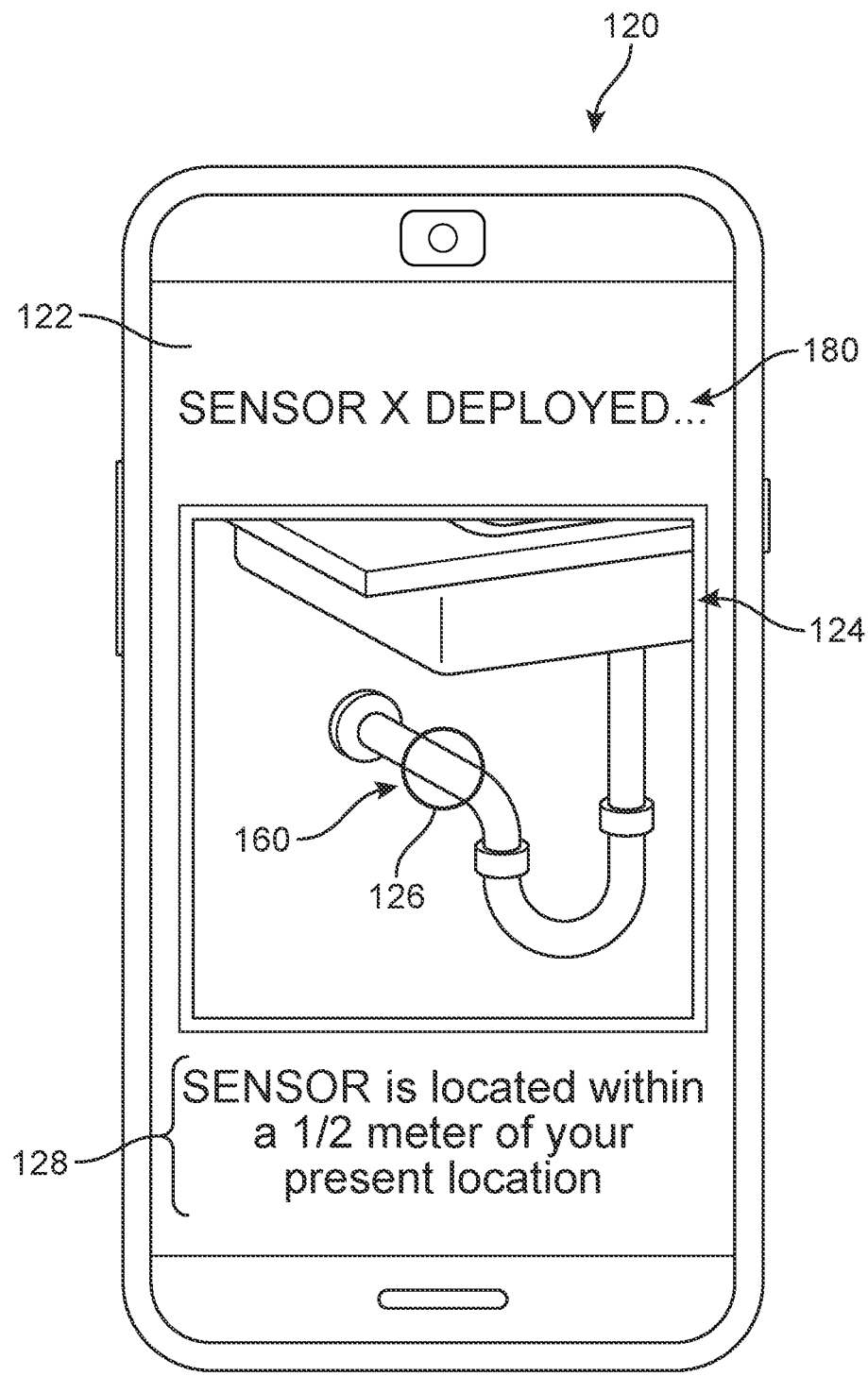

Referring now to FIG. 1B, an example embodiment of the first monitoring device 120, here depicted as a mobile device, that may be used to receive communications from and transmit instructions to the smart sensor device, is shown. In an example embodiment, first device 120 is associated with or belongs to the user who has deployed the smart sensor device and is used together with smart sensor device to conduct a monitoring session. In this embodiment, the mobile device is a cellphone or smart phone, and includes a plurality of components typically found in a cellphone or smart phone, including at least a display 122, a processor, a communication module (e.g., for enabling various wireless network communications, such as via code division multiple access (CDMA) and/or global system for mobile communications (GSM) networks, as well as one or more of Bluetooth, Wi-Fi, and/or other wireless communication technologies), a memory, a connection module (e.g., to enable wired connections, such as via universal serial bus (USB), Lightning connector, etc.), and a battery. In an example embodiment, the mobile device may also include at least one camera or other image sensor. It should be understood that the first device 120 and its respective components described above is merely exemplary and any type of suitable mobile device may be used to communicate with the smart sensor device as described herein. For example, in other embodiments, first device 120 may be a tablet or laptop computer.

In FIG. 1B, the display 122 presents a user interface for a monitoring application ("application") 180 configured to receive data from the sensor device and provide information to the user regarding the location and conditions associated with the sensor device. In this example, "Sensor X" has been deployed and a first digital overlay 126 is superimposed on an image 124 of the sink to illustrate the current location of the sensor device. In some embodiments, additional messaging 128 ("SENSOR is located within a ½ meter of your present location") can provide further information to the user. Other embodiments can include actuatable or other interactive options for the user to adjust settings, transmit instructions or commands, and/or view a more detailed report. This process can allow the user to readily ascertain the position of the clog site 160.

Figure 2:
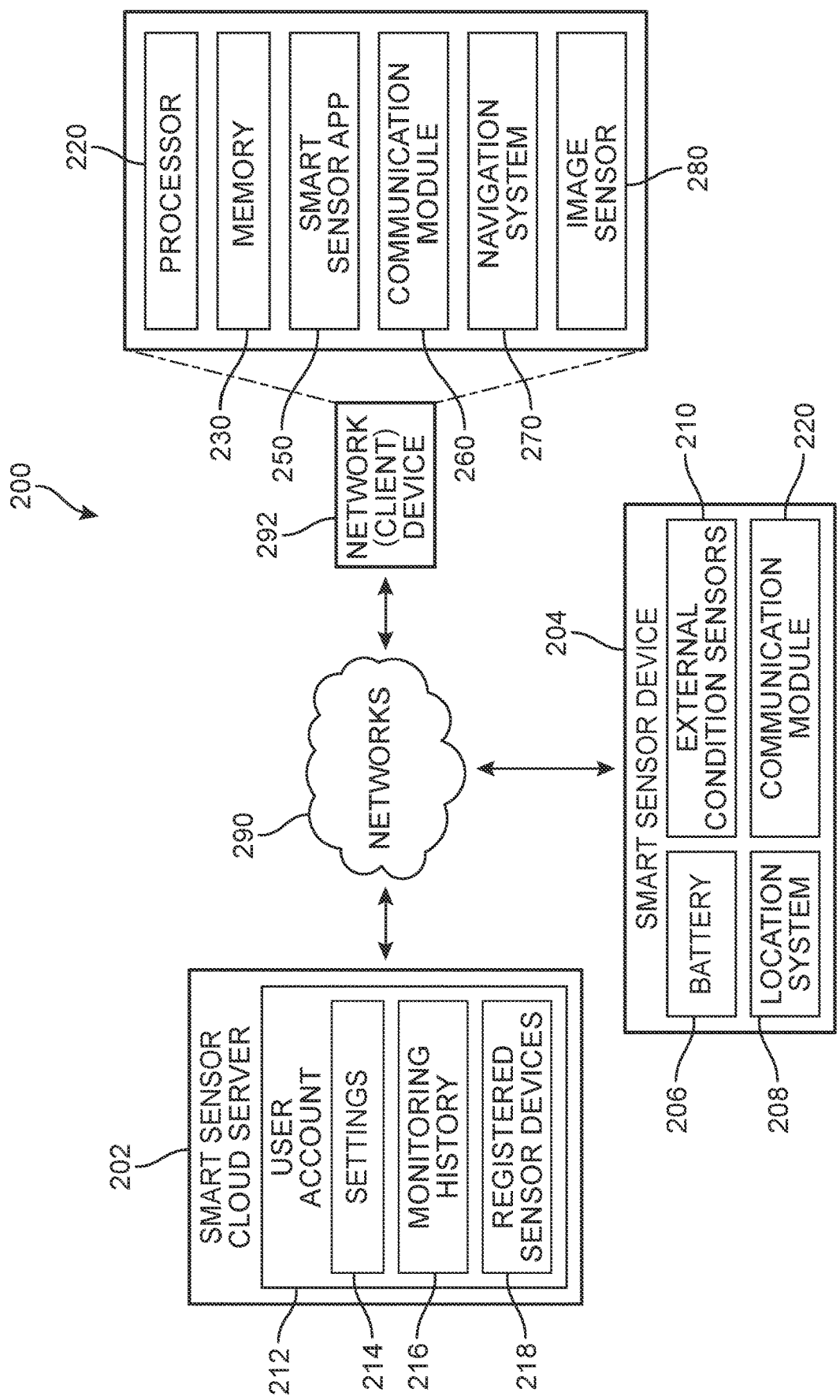
FIG. 2 is a schematic diagram of a smart sensor system, according to an embodiment.

In order to provide the reader with a greater appreciation of the embodiments to the reader, FIG. 2 depicts a schematic diagram representing the architecture of one embodiment of a pipe monitoring system ("system") 200. As shown in FIG. 2, the system 200 includes a network client computing device ("client device") 292 that is configured to communicate over one or more networks 290 to a smart sensor cloud server ("server") 202, as well as one or more smart sensor devices, an example of which is represented by smart sensor device 204. Client device 292 can refer to any computing device such as a desktop or laptop computer or mobile phone, tablet, or other computing device.

Networks 290 could include one or more Wide Area Networks (WANs), Wi-Fi networks, Bluetooth or other Personal Area Networks, RFID, cellular networks, as well as other kinds of networks. It may be appreciated that different devices could communicate using different networks and/or communication protocols. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

In different embodiments, the client device 292 may include provisions for communicating with, and processing information from, nearby networks and/or devices. As seen in FIG. 2, client device 292 may include one or more processors 224 and memory 230. Memory 230 may comprise a non-transitory computer readable medium. Instructions stored within memory 230 may be executed by the one or more processors 224. Client device 292 may also include a local or remotely accessed smart sensor application ("application") 250, a communication module 260, a navigation system 270, and an image sensor 280. Communication module 260 may include radios or other provisions for communicating using one or more communication methods. In particular, communication module 260 includes provisions for communicating with other nearby devices and data services over networks 290. For example, a communication module could include a Wi-Fi radio, a Bluetooth radio, and/or a cellular network radio.

In addition, navigation system 270 may comprise any system capable of providing directions and/or other kinds of routing information between two or more locations as well as determining the user's current location, as well as a GPS receiver that can receive GPS information. In other cases, navigation system 270 can include other receivers capable of receiving global or local positioning information. Additionally, navigation system 270 may comprise maps and/or information from other kinds of geographic information systems (GIS) that can be used to generate navigation routes for a driver. In some cases, navigation system 270 can provide directions in an outdoor environment. In other cases, navigation system 270 can provide directions in an indoor environment. In some cases, navigation system 270 may provide directions in both outdoor and indoor environments.

In some embodiments, an end-user can interact with and adjust settings associated with the proposed system, for example via application 250 running on or accessed through client device 292. In some embodiments, the application 250 can offer a device registration and/or profile interface ("interface") for implementing the monitoring system 200. In some embodiments, an application may be available that connects a user's device (for example, via a Wi-Fi or cellular connection) with an online service provider or manager. For example, application 250 may connect to a smart sensor cloud server ("server") 202 via networks 290 to access or download the application 250, create a user account 212, customize their preferences or settings 214, generate a record of previous monitoring sessions stored as monitoring history 216 and to maintain a profile or listing of registered sensor devices 218 associated with the user account 212.

In different embodiments, a user can use the interface provided by application 250 to change the user settings 214 that may be stored in the cloud, and automatically update the corresponding settings and information. The application can offer a user interface that may be accessed via any user computing device configured for connection to a network. In different embodiments, the application 250 can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, the client device 292 may also include or make use of a more comprehensive smart assistant platform which is configured to provide an array of other functions, including a microphone for receiving voice commands and/or a display for viewing information and inputting touch inputs. For example, the client devices may be configured to perform the functionality of a digital assistant. As described herein, a digital assistant may include any process that executes on a computing device to receive requests from a user, perform operation(s) to process the request, and/or provide result(s) of the operation(s) to the user. A digital assistant may also be described as a personal digital assistant or virtual assistant. A digital assistant may be configured to process requests that are provided by the user as voice commands, inputs to a graphical user interface, or through other types of input. In some examples, a digital assistant may detect speech input that includes utterance(s) by the user, interpret the speech input to determine the user's request, and process the request appropriately. For example, the user may ask the digital assistant to add an item to a shopping cart of the user, such as a shopping cart provided by an online shopping and/or e-commerce service. The digital assistant may process the request by identifying the specified item and adding that item to the user's shopping cart. As another example, the user may ask the digital assistant to look up information regarding a business, such as the address, phone number, and so forth. The digital assistant may perform operations to access the requested information, and provide (e.g., audio) output describing the requested information.

In some examples, a digital assistant may be provided by a hardware manufacturer, such as a mobile device manufacturer, and/or an operating system (OS) provider. Examples of such digital assistants include: Alexa™, provided by Amazon®, Siri™, provided by Apple Inc®; Google Now™, provided by Google, Inc®; and Cortana™, provided by Microsoft Corp®. In some instances, the device manufacturer and/or OS provider that provided the digital assistant may also have manufactured or otherwise provided the hardware and/or software of the computing device where the digital assistant executes. Such digital assistants may be configured to perform various types of operations in response to various requests, and may be described as general-purpose digital assistants. The application may include a digital assistant that processes user requests associated with the provided services. For example, a user may ask, via the digital assistant on his client device, for the system to display a list of his or her registered sensor devices or to initiate a monitoring session via a particular sensor device. In other words, while in some embodiments, the application 250 may be used as a touch-based or other manual input-based interface, in other cases the application 250 may be configured to operate in conjunction with a digital assistant system for providing and enabling intelligent interactions and actions with and for a user.

As noted earlier, a smart sensor device can include a plurality of components configured to communicate and monitor various external conditions. While in some embodiments, the smart sensor device 204 is a waterproof or water-resistant internet of things (IoT) type device, in other embodiments, the smart sensor device 204 can include additional circuitry to permit direct user interactions (i.e., without use of a client device). In this example, the smart sensor device 204 includes a local positioning system such as a Bluetooth low energy (BTLE) core device that further includes a transceiver for sending and receiving information signals and control signals. In some embodiments, the core device also includes a microprocessor, read only memory and random-access memory sufficient to enable the core device to control the other components. In one embodiment, the device is associated with an identification code known to the user and the broadcasts, via an antenna such as a ceramic or trace antenna, the code at periodic intervals that may be preset or selected by the user. In some embodiments, the smart sensor device 204 has a spherical or substantially shape to allow it to travel smoothly through pipes, with a radius smaller than that of the typical pipe (i.e., smaller than 1.5 inches, and typically less than 1 inch). In other embodiments, the sensor device may be minimal (i.e., smaller than 0.5 inches). While a smaller sensor device allows for a smoother transit through the plumbing system or plumbing conduit, it is important that the sensor device is of a size that is large enough to prevent its passing by the obstruction. In other words, while some water may still be able to pass through an obstruction site in a pipe, the sensor device will become 'stuck' in order to accurately identify the obstruction location. In some embodiments, the sensor devices can be offered in a variety of dimensions to allow the user to select the sensor device sized only slightly smaller than the diameter of the narrowest pipe that will be traversed by the sensor device to ensure that the sensor device does not bypass the obstruction. The external surface of the smart sensor device 204 will be generally smooth to facilitate its transit through the piping system, though in some embodiments, the surface may include bumps, dimples, or other small protrusions and texturing. In other embodiments, the smart sensor device 204 may include other geometrical shapes, including elliptical, oval, and multi-sided (e.g., octagonal, etc.). In addition, the smart sensor device 204 is water-resistant and/or waterproof. In addition, in some embodiments, the smart sensor device 204 can include a 'self-destruct' mechanism that may be remotely triggered or automatically triggered after a pre-selected time period that can break the smart sensor device 204 into smaller component pieces, allowing the sensor device to pass more quickly through the plumbing system or conduit and providing the user with a means of dispersing a sensor device that may become accidently or intentionally stuck. In other embodiments, various portions of the sensor device can include materials that are biodegradable and/or can dissolve or decompose automatically over a period of time.

In FIG. 2, the smart sensor device 204 includes one or more external conditions sensors 210 that are configured to sense physical parameters experienced by the sensor device 204, including and not limited to displacement, motion, acceleration, electromagnetic radiation, radioactivity, temperature, sound, pressure and other physical parameters. Such subsensors could comprise any of a variety of different sensors, such as a pressure sensor, chemical sensor, temperature sensor, magnetometer, moisture sensor, electrostatic sensor, volume/sound sensors, light sensors, aerosol characterization sensors, and others. The information output by smart sensor device 204 via sensor communication module 220 enables the monitoring device (here, client device 292) to track the position of the smart sensor device 204 from one location to another location and obtain information about the local environment in which the smart sensor device is disposed. The motion of the smart sensor device 204 can be monitored continuously as long as a receiver is close enough, for example within a 500-foot range, to record the motion output information from the smart sensor device 204. Furthermore, the smart sensor device 204 includes a rechargeable battery 206 that may be recharged via a wireless or wired recharging apparatus or a solar recharging apparatus. Other embodiments of the smart sensor device 204 can have circuitry for harvesting RF power to charge the battery.

Furthermore, as noted earlier, the smart sensor device 204 can include provisions for broadcasting its location, for example via a location system 208. In some embodiments, the smart sensor device 204 may include its own GPS device and broadcast its latitude and longitude coordinates. In other embodiments, the location of a monitoring device, such as client device 292, may be paired with the range of a smart sensor device 204. The location system 208 can employ any type of positioning technology, such as but not limited to indoor positioning systems (IPS) that use radio frequency signals (RF), light-based or optical (i.e., both visible and infrared light) electromagnetic signals, sound signals (audible and ultrasonic), magnetic fields, Wireless Local Area Network (WLAN), Bluetooth, ZigBee, RFID, Ultrawideband (UWB), and/or passive/naturally occurring signals. The location system 208 and external conditions sensors 210 can work in conjunction with sensor communication module 220 to transmit data regarding location and/or sensor conditions to the smart sensor cloud server 202 and/or the client device 292.

In some embodiments, in order to better accommodate the transmission of signal in a water or other fluid-based environment, the communication module 260 of client device 292 and/or the communication module 220 of smart sensor device 204 can be configured to emit data encoded or carried by sound waves. In other words, in some cases, due to water causing an attenuation of electromagnetic waves, an alternative communication protocol may be used by the system. For example, sound waves from client device 292 may be generated that represent specific data such as information or commands or other requests, and the smart sensor device 204 can receive or 'pick up' these sounds (e.g., pulses). In response, the communication module 220 of smart sensor device 204 can encode responses or other information in sound that will be received by communication module 260 of client device 292. As a general matter, the medium of water is understood to carry sound waves well, and the speed of sound in water provides an additional advantage in offering accurate "ranging" from the smart sensor device 204 to the receiver (i.e., the client device 292 or components associated with client device 292) using, for example, a time-of-broadcast packet.

For example, in some embodiments, a receiver can be configured to provide or function as a Wi-Fi bridge, and/or as the original transmitter. In such cases, rather than transmitting data over an antenna via a wireless protocol, the receiver will include or make use of a speaker that also encodes data. The receiver can then be positioned at or adjacent to a known drain line (e.g., the main drain cleanout outside the house, or onto a trap underneath the sink). The receiver can then pick up those encoded sound waves and transmit the information to a cloud backend via Wi-Fi. For example, a sound sensor of sensors 210 can be coupled to the communication module 220. As one non-limiting example, the sound sensor can include a piezoelectric transducer, such as those used as electrically powered output devices that generate audio. Based on the location of the receiver, the typical minimum sound level requirement for such detector/devices, and the form of the signal, the sound energy impinging on the sound sensor can be of sufficient energy to be received and translated, in some cases without needing any other electrical power.

In some other embodiments, the smart sensor device 204 can include one or more buttons or switches that may be operable to perform one of more functions, such as pairing operations, powering on/off, and alert settings. Furthermore, in some embodiments, the smart sensor device 204 includes a clock that may add a time signal to any data transmitted from the smart sensor device 204. The system 200 may also be configured to alert user when a smart sensor device 204 leaves the range of the client device 292 and/or returns to the range of the client device 292 (see FIGS. 8A and 8B). Different responses or alerts could be given at different ranges as the distance between the smart sensor device and the client device changes.

Figure 3:
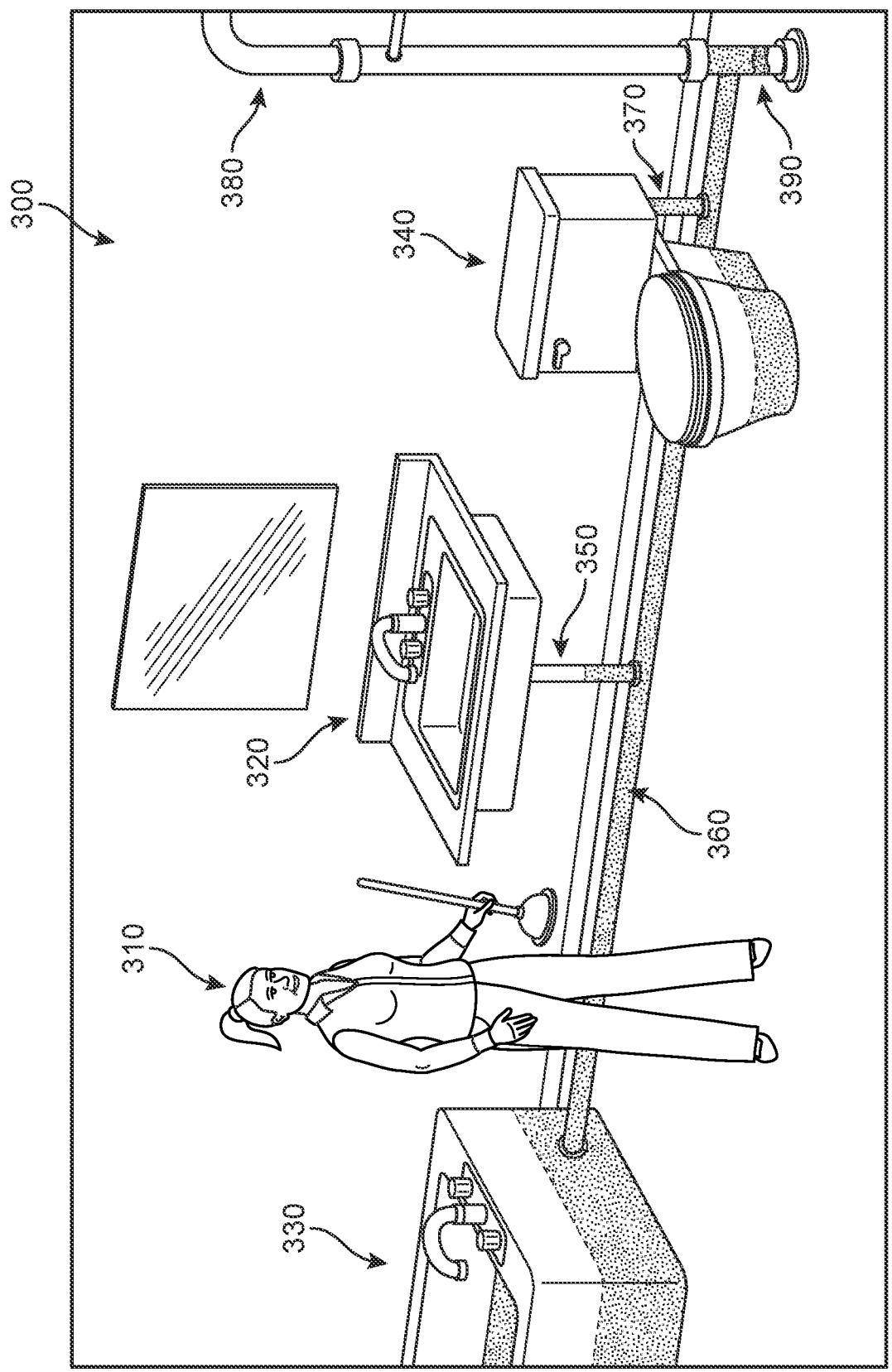
FIG. 3 is an illustration of a user attempting to address a blockage in the local plumbing system, according to an embodiment.
Figure 4B:
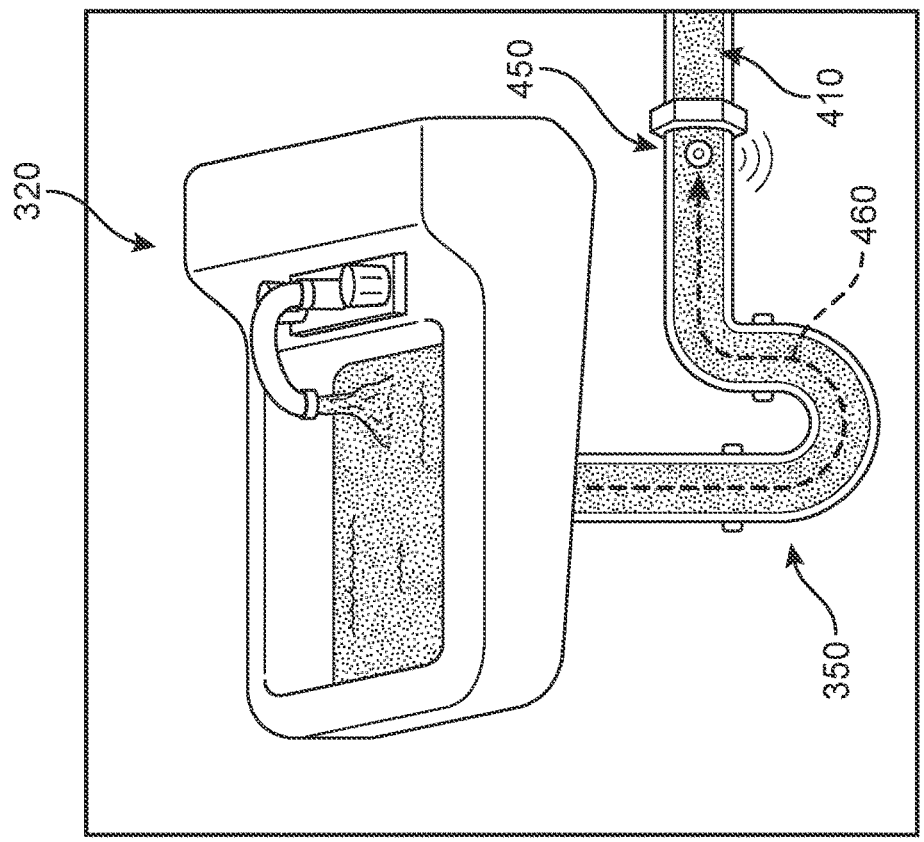
FIGS. 4A and 4B are a depiction of the user deploying a smart sensor device into a sink, according to an embodiment.
Figure 4A:
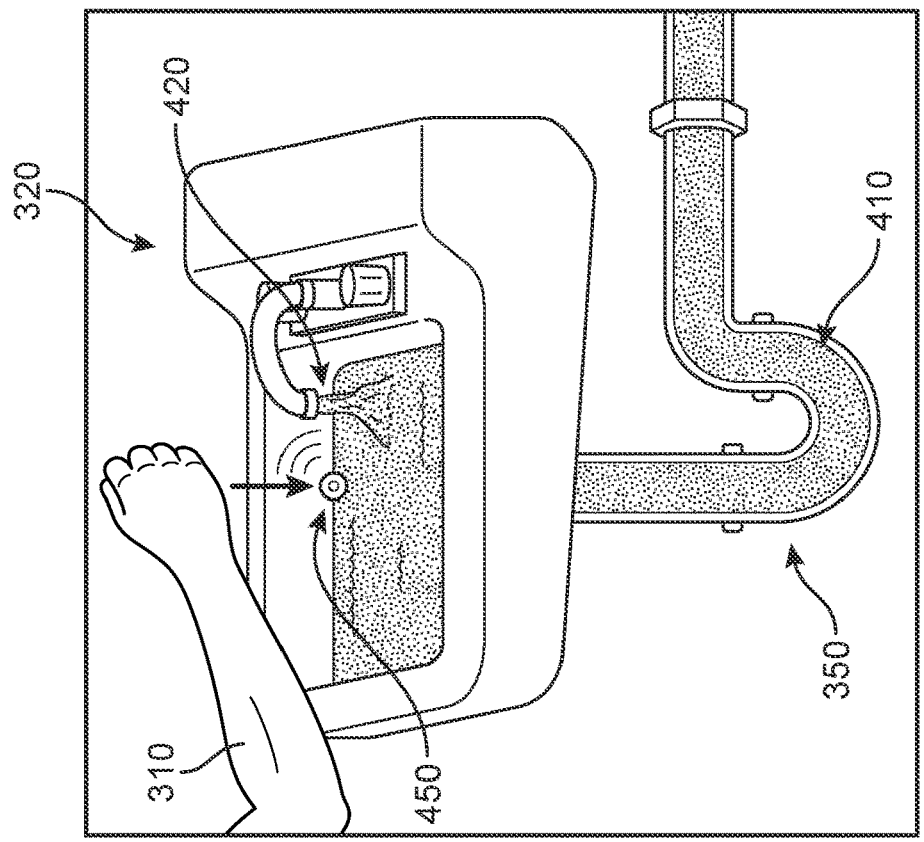
Figure 6:
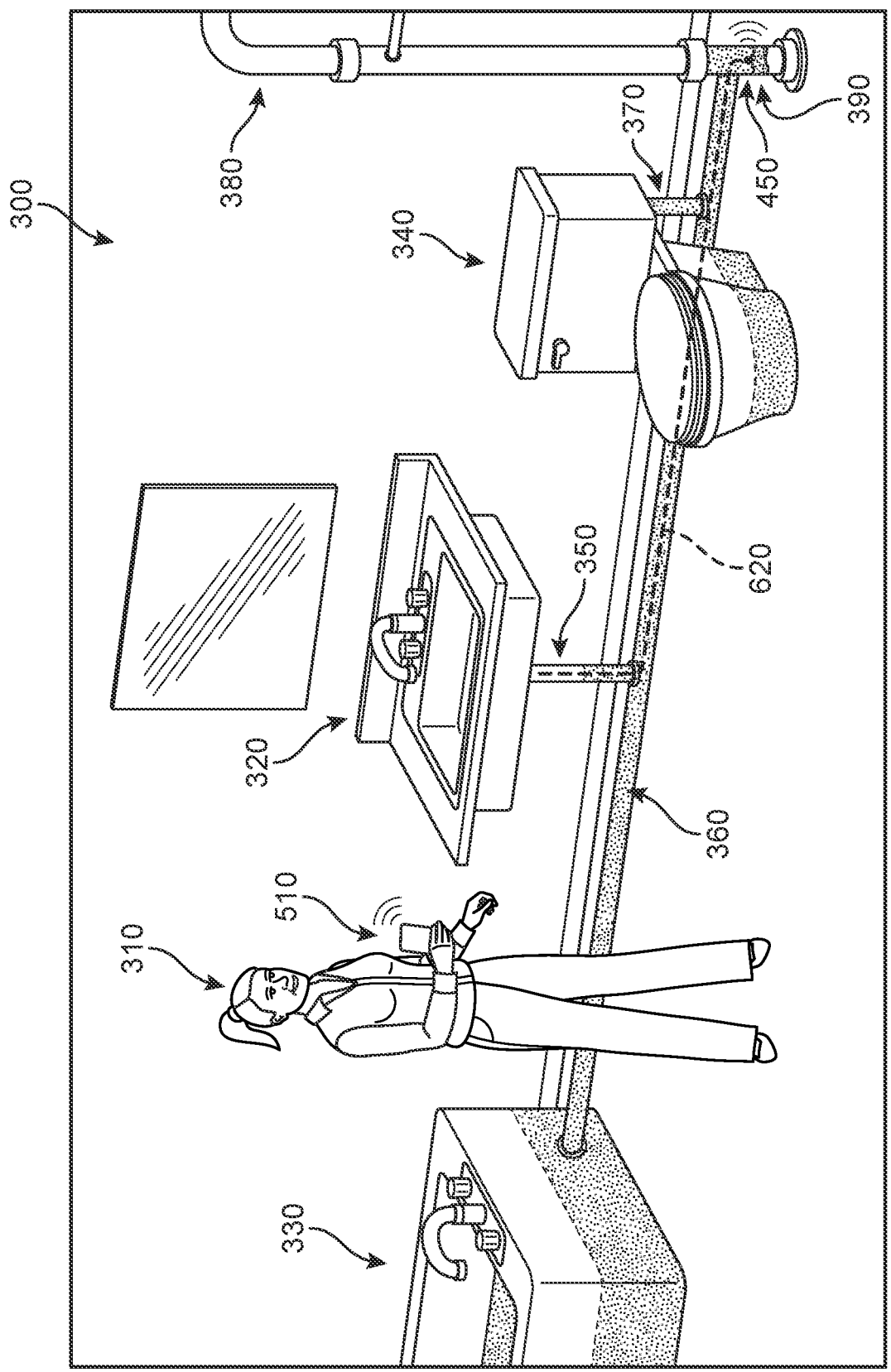

Referring now to FIGS. 3-8B, a sequence of drawings illustrates an example of some advantages and uses of a smart sensor device system ("system") during everyday activities. In FIG. 3, a second user 310 is standing in a bathroom space 300 that includes fixtures such as a bathtub 330, a sink 320, and a toilet 340. Each of these three fixtures are interconnected by a series of pipes comprising the local plumbing system. In FIG. 3, the bathtub 330 drains into a first drain pipe 360. In addition, the sink 320 has a second drain pipe 350 intersecting with the first drain pipe 360, and the toilet 340 has a third drain pipe 370 intersecting with the first drain pipe 360. The first drain pipe 360 is then connected further downstream to a primary or main drain pipe stack ("primary pipe") 380 that channels wastewater to main drain lines leading out to the city sewer system or septic field. In FIG. 3, it can be observed that the three fixtures are experiencing drainage issues, such that water flow is being impeded. In this case, water flow is relatively slow-moving or stagnant, and the second user 310 is attempting to understand why the flow has become blocked.

In order to diagnose the problem, the second user 310 can deploy a smart sensor device into the plumbing system to locate obstruction site 390. For example, in FIG. 4A, second user 310 is shown depositing a first smart sensor device ("first sensor device") 450 into fluid 410 associated with the sink 320. The first sensor device 450 was previously paired via a smart sensor application ("application") to a nearby computing device and is configured to transmit data to and receive data from the paired computing device. The data can be transmitted as an electronic signal via sensor device components such as radio frequency identification devices (RFID), radio transmitters and/or transceivers capable of transmitting and/or receiving including but not limited to one or more of the following types of signals and/or protocols: cellular network signals, Wi-Fi network signals, Bluetooth® signals, short or long range radio signals, RFID signals, infrared signals, sonic and ultrasonic signals, global positioning system (GPS) signals and other radio signals, optical and laser signals, and signals across any known spectrum of wavelengths and/or frequency.

In some embodiments, an identification (ID) number, name or code may be assigned to the first sensor device 450. The object ID may be registered with one or more monitoring computing devices ("monitoring devices"). If it is determined that the electronic signal transmitted by the first sensor device 450 has being detected by the coupled or paired computing device (e.g., is out of range of the signal), this may indicate that the first sensor device 450 is too far from the monitoring device. Alternatively, or in addition to loss of signal detection from the paired monitoring device, location systems such as GPS and/or triangulation capabilities within the monitoring device and/or the sensor device may be used to indicate the sensor device is outside a preselected range from the monitoring device. If the monitoring device stops detecting a signal from a registered monitoring device (e.g., is out of range of signal) or is otherwise determined to be too far (i.e., beyond a determined distance) from the monitoring device the sensor device may initiate a beacon signal on various channels simultaneously or singularly. These channels may include, but are not limited to one or more of the following: cellular networks, Wi-Fi networks, Bluetooth® networks, short or long range radio networks, RFID networks, infrared networks, sonic and ultrasonic networks, global positioning system (GPS) networks and other radio networks, optical and laser networks, and networks across any known spectrum of wavelengths and/or frequency. In addition, the application running on monitoring device may issue an alert message indicating the current out-of-range status of the sensor device. As water flow 420 travels through second drain pipe 350, it can carry the first sensor device 450 through fluid 410, as represented by a dotted line 460 in FIG. 4B.

In FIG. 5, second user 310 is shown holding a first monitoring device 510 via which she can transmit a remote activation signal to the first sensor device 450. In other embodiments, the first sensor device 450 may be activated (i.e., turned on or shifted from a passive mode into an active tracking mode) by contact with liquid, detection of darkness, and/or a manual switch or button formed on a surface of the sensor device. First sensor device 450 travels to the intersection region between second drain pipe 350 and first drain pipe 360, it continues to move with the general flow of water (see dotted line 520), past toilet 340, toward primary pipe 380. At any point during this journey, the second user 310 can receive data from first sensor device 450 via the sensor application running on first monitoring device 510. In some embodiments, the second user 310 can interact with the sensor application to initiate specific data transmissions from first sensor device 450 at specific times or intervals. In addition, the second user 310 can request data corresponding to measurements of specific conditions in the environment in which the sensor device is currently disposed.

In some cases, the first sensor device 450 can continue moving until it reaches an obstruction. For example, in FIG. 6, the first sensor device 450 has exited the first drain pipe 360 and moved into primary pipe 380, and arrived at obstruction site 390. Once the first sensor device 450 arrives at the blocked region, it may no longer be able to move through the plumbing system and becomes relatively stationary. At this time, the sensor device can, upon detecting little to no movement of the sensor device, be configured to automatically emit an alert signal to the paired monitoring device 510.

Figure 7:
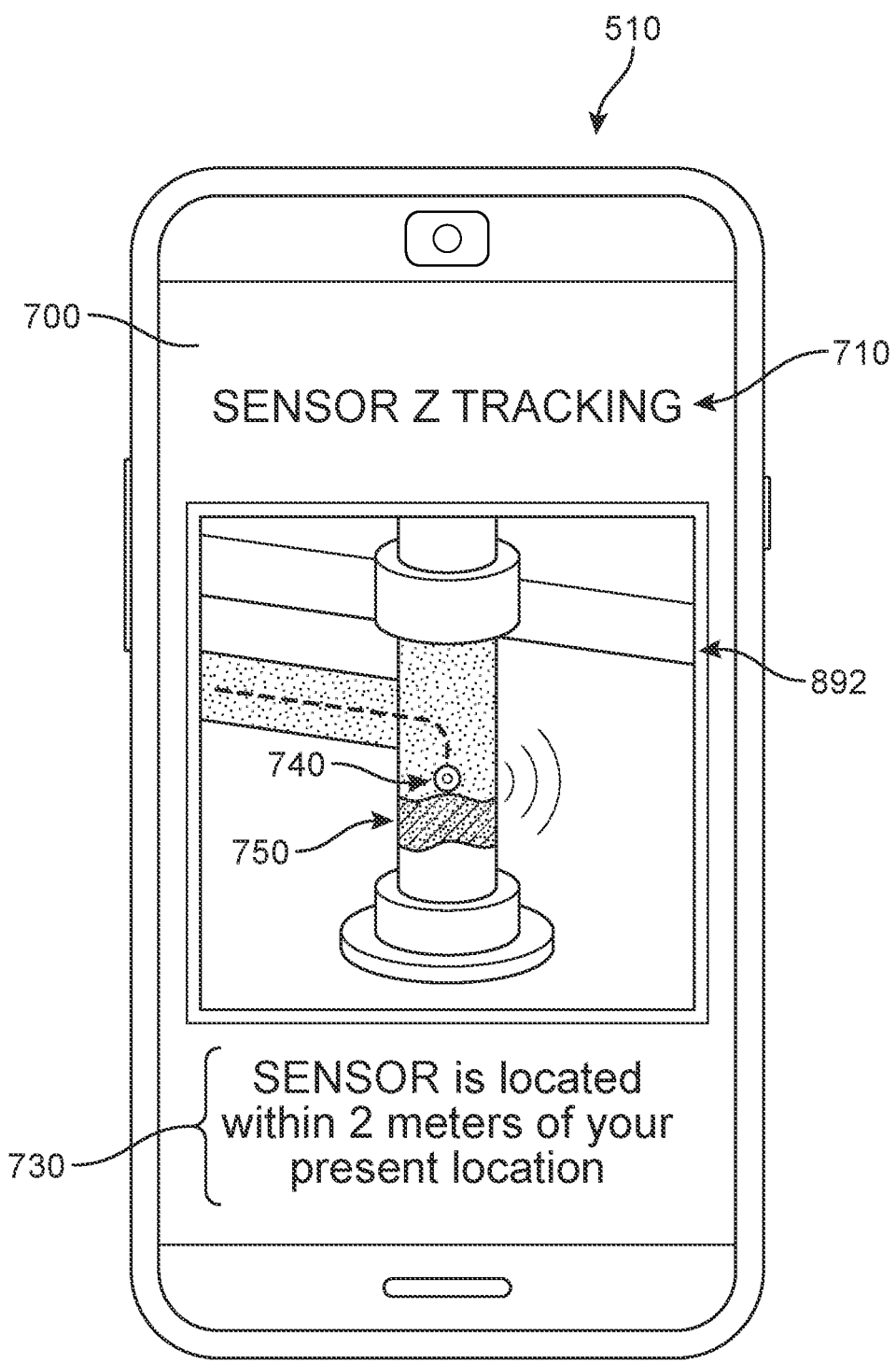
FIG. 7 is an example of a user interface for a smart sensor application that is configured to receive data from the deployed smart sensor device indicating a location of the smart sensor device, according to an embodiment.

Referring to FIG. 7, an example of a user interface for an application 700 is shown via a display 710 of monitoring device 510. The application 700 presents a first message 710 identifying the sensor device ("Sensor Z Tracking"), and may also include an alert that the sensor device is no longer moving or is substantially stationary, indicating that its current location corresponds to the obstruction site. In some embodiments, the application 700 can be configured to coordinate with a real-time or 'live' view of the monitoring device 510 being received by an image sensor integrated in or connected to the monitoring device 510. If the monitoring device 510 is within range of the sensor device, it can appear on the screen as a digital overlay on the camera's view. In addition, if the monitoring device is moved closer to the location of the sensor device, the image can 'home in' to better depict the estimated position of the sensor device. For example, an augmented image 720 is presented via application 700, where the primary pipe includes a symbolic representation 740 of the sensor device and a representation 750 of the obstruction site as reflected by current sensor conditions. A second message 730 ("Sensor is located within 2 meters of your present location") may also be presented indicating a general range of the sensor device from the monitoring device.

Figure 8A:
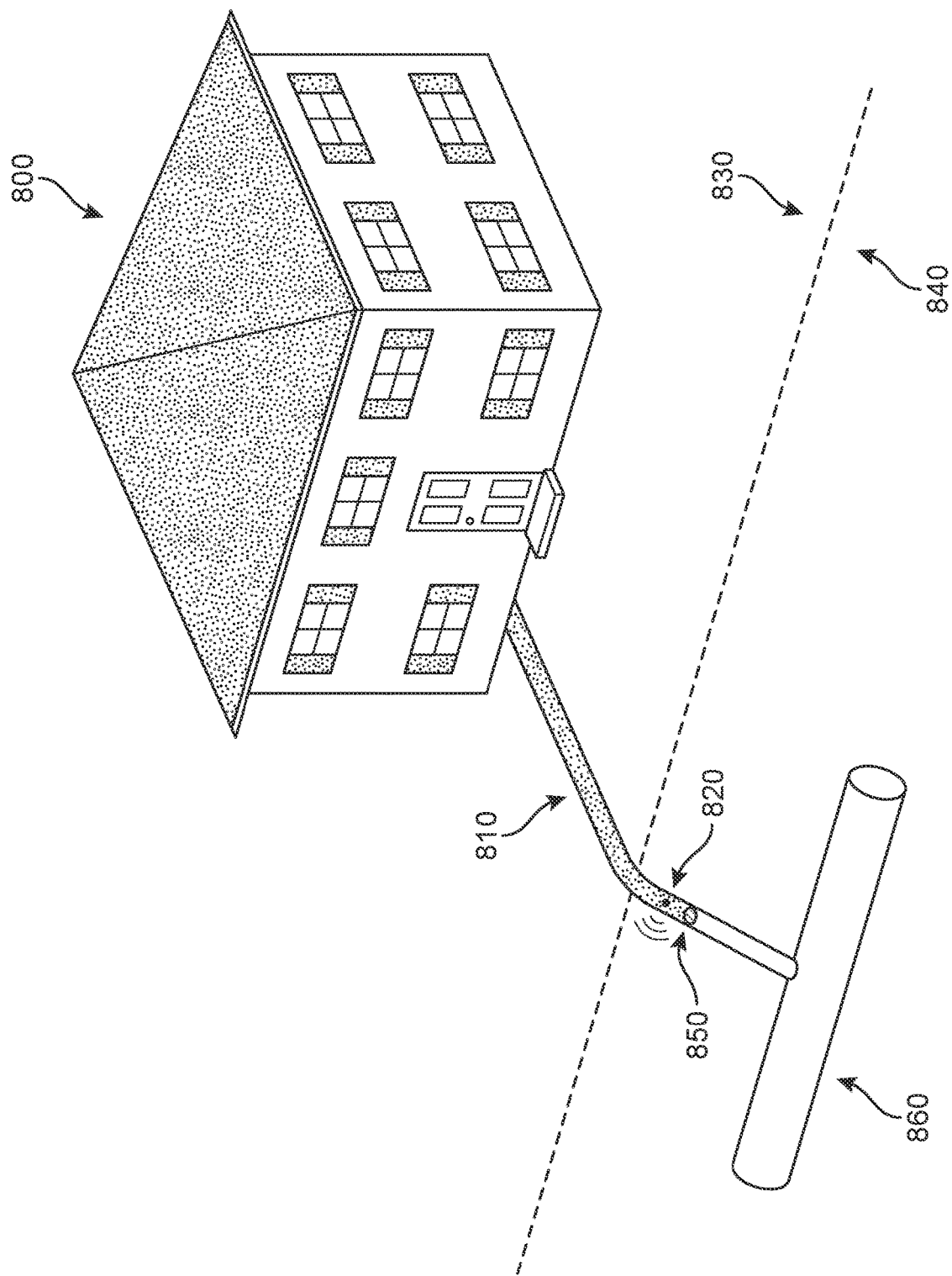
FIG. 8A is an illustration of a plumbing system for a home in which a smart sensor device has been deployed and travels beyond the boundary of the local pipeline, according to an embodiment.
Figure 8B:
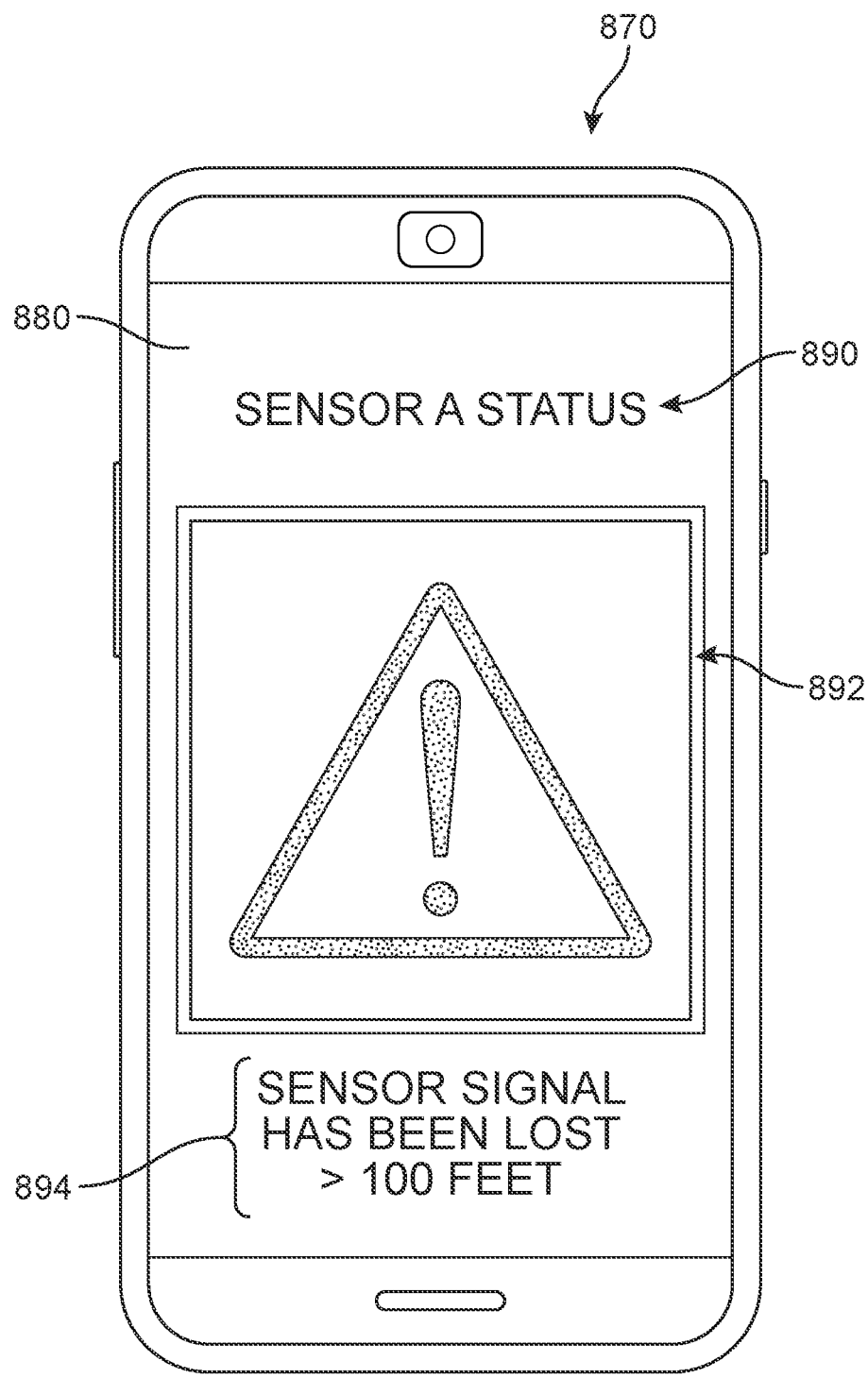
FIG. 8B is an example of a user interface for a smart sensor application that is configured to present information regarding the location of the deployed smart sensor device, according to an embodiment.

As noted earlier, in some cases, the obstruction site may not be located within the local plumbing system of the house or other building unit. In such cases, the application can be configured to alert the user if the tracked sensor device goes beyond a specific range. For example, a user may be interested to know whether the obstruction is located within pipes for which repairs the user is responsible for, or whether the obstruction is located farther 'down the line' and any damage or repair is the responsibility of the municipality or sewage company. An example of this scenario is depicted in FIGS. 8A and 8B. In FIG. 8A, a second sensor device 820 has been deployed from a user located within a house 800 with a monitoring device that is paired to the second sensor device 820. In this case, the plumbing system for the house extends to a boundary (see dotted line) that defines a homeowner side 830 and a municipal side 840. An obstruction site 850 has formed in a portion of a main pipe 810 past the boundary (see dotted line) on the municipal side 840, relatively close to a sewer line 860. Referring to FIG. 8B, an application 800 presented on a display of a second monitoring device 870 associated with the user. The application 800 can include a first message 890 ("Sensor A Status") identifying the tracked sensor device, an alert 892 indicating that a signal is no longer being received by the tracked sensor device, and a second message 894 providing information as to the range of the tracked device ("Sensor Signal has been lost >100 Feet"). In other embodiments, the user can preselect a range which, if exceeded by the sensor device, can trigger an alert via application 880, allowing the user to quickly determine if the obstruction is outside a specific boundary. In another embodiment, there may be various time limits set for when the alert beacon is to begin after the tracked sensor device leaves out of range, and for when it stops after the tracked sensor device has become stationary.

In different embodiments, data provided by the sensor device may include various information including but not limited to current and previous location information of the sensor device, the time when the sensor device went out of range, the time when the sensor device passed a specific distance or range, the duration of time from deployment until the sensor device became stationary, external conditions of the environment in which the sensor device is disposed, such as temperature, pressure, moisture, light intensity, chemicals, and/or conditions of the sensor device itself, such as speed and acceleration. These measurements can be presented to the user automatically or upon receiving a request for such information by the user.

Figure 9:
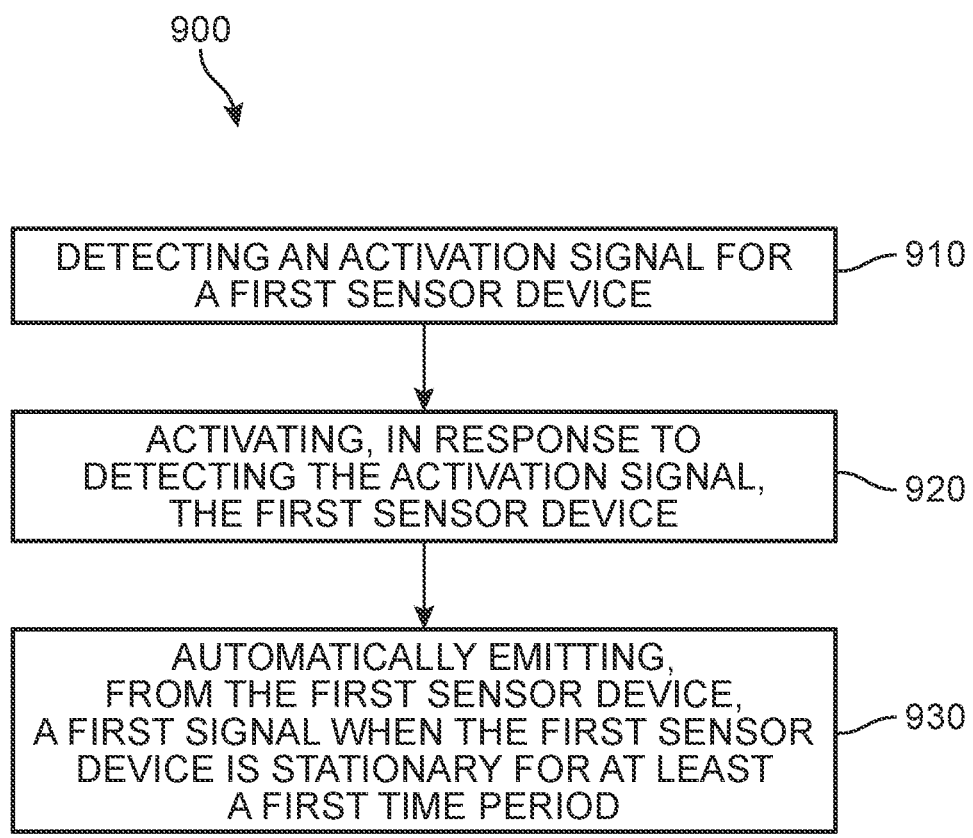
FIG. 9 is an example of a user interface for accessing and managing personal information stored in a vehicle, according to an embodiment, according to an embodiment.

FIG. 9 is a flow chart illustrating an embodiment of a method 900 of generating data indicating a location of an obstruction in a plumbing system. The method 900 includes a first step 910 of detecting an activation signal for a first sensor device, and a second step 920 of activating, in response to detecting the activation signal, the first sensor device. The method 900 also includes a third step 930 of automatically emitting, from the first sensor device, a first signal when the first sensor device is stationary for at least a first time period, such as 30 seconds to a few minutes.

In other embodiments, the method may include additional steps or aspects. In one embodiment, the method also includes causing to be displayed, at a first computing device and in response to the first signal, a message indicating that the first sensor device has arrived at an obstruction site. In another embodiment, the method also includes causing to be displayed, at a first computing device and in response to the first signal, a message indicating an estimated distance of the first sensor device from the first computing device. In one example, the first sensor device is disposed or traveling within a pipe, and the method further comprises causing to be displayed, at a first computing device and in response to the first signal, an augmented image in which a current estimated location of the first sensor device is represented by a digital overlay superimposed on an image of the pipe. The first computing device can be paired to the first sensor device and configured to receive/transmit data to the first sensor device.

In another example, the method further includes steps of receiving, while the first sensor device is moving, a first monitoring request from a first computing device, and then generating, in response to the first monitoring request, a second signal from the first sensor device. In addition, the method can then include the step of causing to be displayed, at the first computing device and in response to the second signal, a message indicating that the first sensor device is currently in transit. In some embodiments, the method further includes steps of receiving, at the first sensor device and while the first sensor device is moving, a first monitoring request from a first computing device, and then generating, in response to the first monitoring request, a second signal from the first sensor device, and causing to be displayed, at the first computing device and in response to the second signal, a message indicating an estimated distance of the first sensor device from the first computing device.

In different embodiments, the method also includes steps of receiving, at the first sensor device, a first monitoring request from a first computing device, and then generating, in response to the first monitoring request, a second signal from the first sensor device, and causing to be displayed, at the first computing device and in response to the second signal, a message including a measurement of a first condition of an environment in which the first sensor device is currently disposed. In such cases, the first condition can include one of temperature, humidity, pressure, speed, and light.

In another example, the method further includes emitting, from the first sensor device, a second signal when the first sensor device is outside a pre-selected range of the first computing device. In one embodiment, the activation signal is triggered in response to one of a remote user input transmitted to the first sensor device, detection of darkness by the first sensor device, and detection of water by the first sensor device. In some embodiments, the method may further include the step of pairing, coupling, or connecting the first sensor device to the first monitoring device via a sensor application operating on the first monitoring device. In some cases, the first sensor device includes one or more materials that are at least partially biodegradable. In another example, the method can include receiving, from the first monitoring device, a request to dispose of the sensor device, and in response to receiving the request, initiating a decomposition or self-destruct mechanism that breaks the sensor device into multiple pieces to facilitate disposal through a plumbing system. In some embodiments, the sensor device can comprise materials that dissolve in water over a period of time that expedite its decomposition.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of generating data indicating a location of an obstruction in a plumbing system, the method comprising:
   detecting, at a first sensor device traveling through the plumbing system, sound waves generated from a first computing device, the sound waves carrying a first command signal generated via a monitoring application running on the first computing device;
   emitting, from the first sensor device and in response to the first command signal, an alert signal for presentation at the first computing device when the first sensor device is stationary for at least a first time period that indicates a current position of the first sensor device is the location of the obstruction;
   receiving, at the first sensor device, a first disposal request from the monitoring application running on the first computing device; and
   initiating, by the first sensor device and in response to the first disposal request, a self-destruct mechanism that breaks the first sensor device into multiple smaller pieces.

2. The method of claim 1, further comprising:
   obtaining, by the first sensor device, information about a local environment in which the first sensor device is disposed;
   encoding, at the first sensor device, the information as a time-of-broadcast packet; and
   transmitting, from the first sensor device and to the monitoring application running on the first computing device, the time-of-broadcast packet.

3. The method of claim 1, further comprising causing to be displayed, via the monitoring application running on the first computing device and in response to the first command signal, a message indicating an estimated distance of the first sensor device from the first computing device.

4. The method of claim 1, wherein the first sensor device is disposed in a pipe, and the method further comprises causing to be displayed, via the monitoring application running on the first computing device and in response to the first command signal, an augmented image in which a current location of the first sensor device is represented by a digital overlay superimposed on an image of the pipe.

5. The method of claim 1, further comprising:
   receiving, at the first sensor device, a first monitoring request from the monitoring application running on the first computing device;
   obtaining, by the first sensor device and in response to the first monitoring request, information about external conditions of a local environment in which the first sensor device is disposed including one or more of temperature, pressure, moisture, light intensity; and
   transmitting, from the first sensor device and to the first computing device, the information for presentation via a user interface of the monitoring application.

6. The method of claim 1, further comprising:
   receiving, at the first sensor device and while the first sensor device is moving, a first monitoring request from the monitoring application running on the first computing device;
   obtaining, by the first sensor device and in response to the first monitoring request, information including one or more of a speed and acceleration of the first sensor device; and
   transmitting, from the first sensor device and to the first computing device, the information for presentation via a user interface of the monitoring application.

7. The method of claim 1, wherein the first sensor device has a spherical shape to allow it to travel smoothly through pipes.

8. The method of claim 1, wherein the first sensor device comprises materials that are biodegradable.

9. The method of claim 1, further comprising:
   receiving, at the first sensor device and from the first computing device, a selection of a first range; and
   emitting, from the first sensor device, a signal when the first sensor device is outside the selected range of the first computing device.

10. The method of claim 1, wherein the sound waves are received by a piezoelectric transducer.

11. A system for generating data indicating a location of an obstruction in a plumbing conduit, the system comprising a processor and machine-readable media including instructions which, when executed by the processor, cause the processor to:
    detect, at a first sensor device traveling through the plumbing system, sound waves generated from a first computing device, the sound waves carrying a first command signal generated via a monitoring application running on the first computing device;
    emit, from the first sensor device and in response to the first command signal, an alert signal for presentation at the first computing device when the first sensor device is stationary for at least a first time period that indicates a current position of the first sensor device is the location of the obstruction;
    receive, at the first sensor device, a first disposal request from the monitoring application running on the first computing device; and
    initiate, by the first sensor device and in response to the first disposal request, a self-destruct mechanism that breaks the first sensor device into multiple smaller pieces.

12. The system of claim 11, wherein the instructions further cause the processor to:
    obtain, by the first sensor device, information about a local environment in which the first sensor device is disposed;
    encode, at the first sensor device, the information as a time-of-broadcast packet; and
    transmit, from the first sensor device and to the monitoring application running on the first computing device, the time-of-broadcast packet.

13. The system of claim 11, wherein the instructions further cause the processor to cause to be displayed, via the monitoring application running on the first computing device and in response to the first command signal, a message indicating an estimated distance of the first sensor device from the first computing device.

14. The system of claim 11, wherein the first sensor device is disposed in a pipe, and the instructions further cause the processor to cause to be displayed, via the monitoring application running on the first computing device and in response to the first command signal, an augmented image in which a current location of the first sensor device is represented by a digital overlay superimposed on an image of the pipe.

15. The system of claim 11, wherein the instructions further cause the processor to:
   receive at the first sensor device, a first monitoring request from the monitoring application running on the first computing device;
   obtain, by the first sensor device and in response to the first monitoring request, information about external conditions of a local environment in which the first sensor device is disposed including one or more of temperature, pressure, moisture, light intensity; and
   transmit, from the first sensor device and to the first computing device, the information for presentation via a user interface of the monitoring application.

16. The system of claim 11, wherein the instructions further cause the processor to:
   receive, at the first sensor device and while the first sensor device is moving, a first monitoring request from the monitoring application running on the first computing device;
   obtain, by the first sensor device and in response to the first monitoring request, information including one or more of a speed and acceleration of the first sensor device; and
   transmit, from the first sensor device and to the first computing device, the information for presentation via a user interface of the monitoring application.

17. The system of claim 11, wherein the sound waves are received by a piezoelectric transducer.

18. The system of claim 11, wherein the first sensor device comprises materials that are biodegradable.

19. The system of claim 11, wherein the instructions further cause the processor to:
   receive, at the first sensor device and from the first computing device, a selection of a first range; and
   emit, from the first sensor device, a signal when the first sensor device is outside the selected range of the first computing device.

20. A system comprising one or more computers and one or more storage devices storing instructions that are operable, when executed by the one or more computers, to cause the one or more computers to:
   detect, at a first sensor device traveling through a plumbing system, sound waves generated from a first computing device, the sound waves carrying a first command signal generated via a monitoring application running on the first computing device;
   emit, from the first sensor device and in response to the first command signal, an alert signal for presentation at the first computing device when the first sensor device is stationary for at least a first time period that indicates a current position of the first sensor device is a location of an obstruction;
   receive, at the first sensor device, a first disposal request from the monitoring application running on the first computing device; and
   initiate, by the first sensor device and in response to the first disposal request, a self-destruct mechanism that breaks the first sensor device into multiple smaller pieces.

* * * * *